United States Patent
Dunaisky et al.

(10) Patent No.: US 8,063,908 B1
(45) Date of Patent: Nov. 22, 2011

(54) SYSTEM, METHOD, AND COMPUTER PROGRAM PRODUCT FOR VALIDATING A GRAPHICS PROCESSOR DESIGN

(75) Inventors: Jonathan J. Dunaisky, Fort Collins, CO (US); John Malcolm Neil, San Mateo, CA (US); Subodh Kumar, New Delhi (IN)

(73) Assignee: NVIDIA Corporation, Santa Clara, CA (US)

( * ) Notice: Subject to any disclaimer, the term of this patent is extended or adjusted under 35 U.S.C. 154(b) by 1048 days.

(21) Appl. No.: 11/937,395

(22) Filed: Nov. 8, 2007

(51) Int. Cl.
*G06F 13/14* (2006.01)

(52) U.S. Cl. ........ 345/519; 700/110; 382/141; 382/149; 382/294; 716/100; 716/106; 716/111; 716/112; 348/87; 714/741

(58) Field of Classification Search .......... 382/151, 382/149
See application file for complete search history.

(56) References Cited

U.S. PATENT DOCUMENTS

| | | | |
|---|---|---|---|
| 6,445,812 B1* | 9/2002 | Lai et al. | 382/141 |
| 6,634,018 B2* | 10/2003 | Randall et al. | 716/52 |
| 2005/0010922 A1* | 1/2005 | Czajkowski et al. | 718/102 |
| 2005/0198602 A1* | 9/2005 | Brankner | 382/151 |
| 2006/0064656 A1* | 3/2006 | Lakshmanan et al. | 716/5 |
| 2006/0291714 A1* | 12/2006 | Wu et al. | 382/149 |
| 2007/0052963 A1* | 3/2007 | Orbon et al. | 356/430 |
| 2007/0058885 A1* | 3/2007 | Leib et al. | 382/294 |
| 2007/0233419 A1* | 10/2007 | Pack et al. | 702/127 |
| 2008/0115028 A1* | 5/2008 | Homer et al. | 714/741 |
| 2008/0250364 A1* | 10/2008 | Chilwal et al. | 716/5 |
| 2009/0240364 A1* | 9/2009 | Lucas et al. | 700/105 |
| 2010/0020167 A1* | 1/2010 | Zandifar et al. | 348/87 |

* cited by examiner

*Primary Examiner* — Xiao Wu
*Assistant Examiner* — Phi Hoang
(74) *Attorney, Agent, or Firm* — Zilka-Kotab, PC

(57) ABSTRACT

A system, method, and computer program product are provided for validating a graphics processor design. In operation, a test image is identified. Additionally, a reference image is automatically selected from a set of reference images. Furthermore, a graphics processor design is validated using the test image and the selected reference image.

23 Claims, 5 Drawing Sheets

SYSTEM, METHOD, AND COMPUTER PROGRAM PRODUCT FOR VALIDATING A GRAPHICS PROCESSOR DESIGN

FIELD OF THE INVENTION

The present invention relates to integrated circuit design validation, and more particularly to validating graphics processor design.

BACKGROUND

Graphics processor validation typically involves testing whether a graphics processor design is valid and/or meets certain requirements. For example, such validation may involve the comparison of a test image with a reference image selected from a set of reference images. Such reference image selection is typically manual in nature and is a function of various combinations of selected parameters that are relevant to a particular test. In use, proper design of the graphics processor may thus been ascertained based on the results of the foregoing comparison involving a number of the test and reference images. While such testing is feasible for a small number of images, it can become challenging when dealing with a large set of reference images, etc.

There is thus a need for addressing these and/or other issues associated with the prior art.

SUMMARY

A system, method, and computer program product are provided for validating a graphics processor design. In operation, a test image is identified. Additionally, a reference image is automatically selected from a set of reference images. Furthermore, a graphics processor design is validated using the test image and the selected reference image.

DETAILED DESCRIPTION

Figure 1:
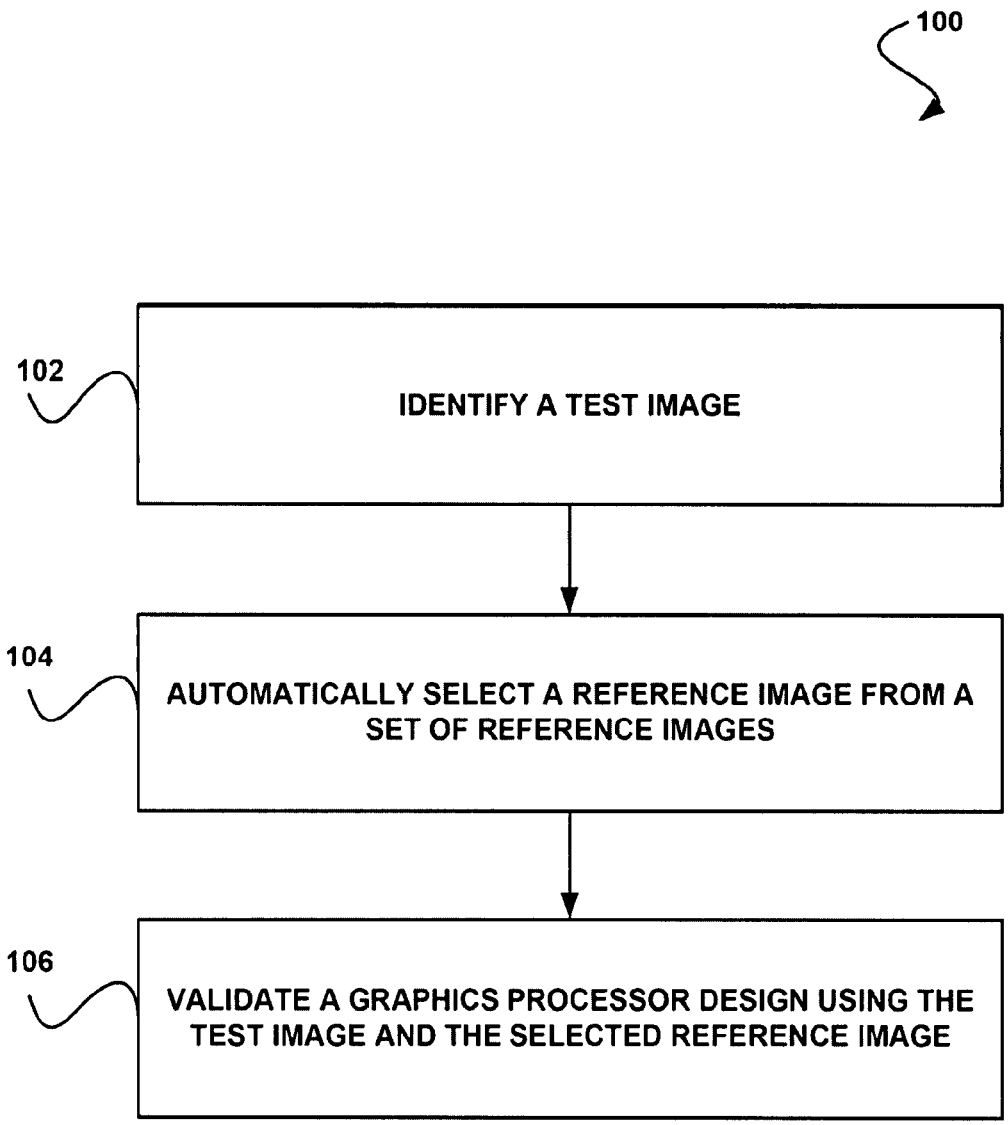
FIG. 1 shows a method for validating a graphics processor design, in accordance with one embodiment.

FIG. 1 shows a method 100 for validating a graphics processor design, in accordance with one embodiment. As shown, a test image is identified. See operation 102. In the context of the present description, a test image refers to any image that may be processed by a graphics processor for validating the functionality of the graphics processor design.

In the present description, the graphics processor design may include any integrated circuit design with graphics capabilities that may be validated. Strictly as an option, the graphics processor design may include a graphics processing unit (GPU) design. Of course, in other embodiments, the graphics processor design may include a central processing unit (CPU) design with integrated graphics capabilities, etc.

As shown further, a reference image is automatically selected from a set of reference images. See operation 104. In the context of the present description, a reference image refers to any image against which the test image may be compared for validation purposes. As an option, the set of reference images may be stored in a database.

For example, in one embodiment, the reference image may be one that has been automatically or manually verified to be a desired result of graphics processing given a known set of parameters. In one embodiment, the reference image may be selected from the set of reference images based on such parameters (e.g. of the test image or the processing thereof). In various embodiments, such parameters may include, but are not limited to a test program used, color format, a depth format, an anti-alias mode, and an image size.

In other embodiments, the parameters may include various other test specific parameters. For instance, such test specific parameters may include an enabled/disabled color buffer indicator, an enabled/disabled Z-buffer indicator, and/or any other test specific parameters. In one embodiment, such parameters may be included in a signature or a key [e.g. a cyclic redundancy check (CRC) key].

As shown further, a graphics processor design is validated using the test image and the selected reference image. See operation 106. In one embodiment, the validation may include comparing the test image and the selected reference image. Strictly as an option, the validation may include determining a difference between the test image and the selected reference image, and comparing such difference to a threshold.

By virtue of the foregoing automatic reference image selection, the validation may be performed with additional efficiency. This may be particularly useful, in one embodiment, in cases where a large number of reference images exist to accommodate a multitude of graphics processing parameters involved.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
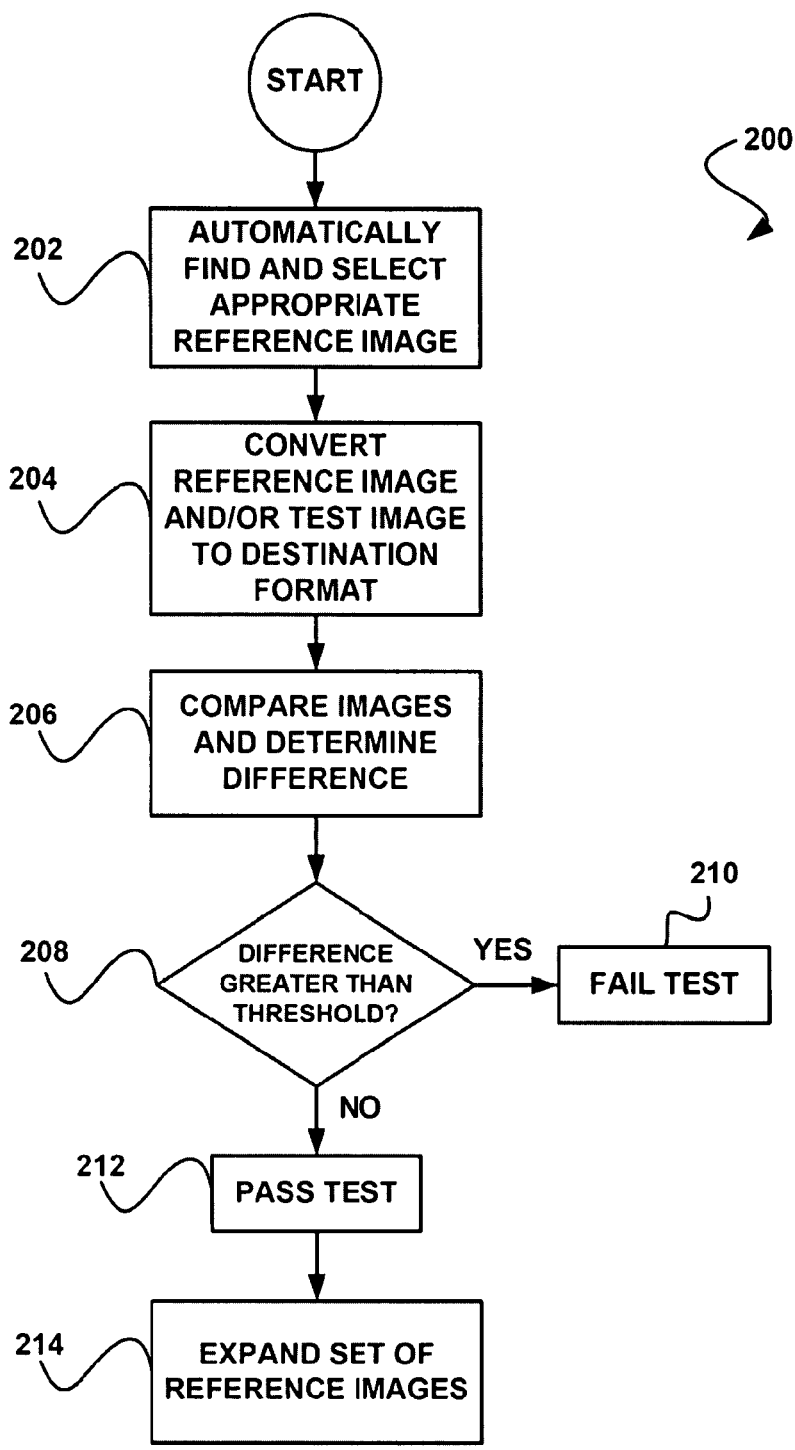
FIG. 2 shows a method for validating a graphics processor design, in accordance with another embodiment.

FIG. 2 shows a method 200 for validating a graphics processor design, in accordance with another embodiment. As an option, the present method 200 may be implemented in the context of the functionality of FIG. 1. Of course, however, the method 200 may be carried out in any desired environment. It should also be noted that the aforementioned definitions may apply during the present description.

As shown, an appropriate reference image is automatically found in a set of reference images, and selected. See operation 202. The appropriate reference image may be automatically selected based on parameters from when a test image was created. Specifically, a reference image with a predetermined parameter(s) that matches that of a test image may be selected, for the purpose of determining whether the test image matches (to a desired extent) the reference image. As will soon become apparent, this may, in turn, verify proper operation of an associated graphics processor design, etc.

Thus, in one embodiment, the reference image may be selected from the set of reference images based on at least one parameter. Such parameter or parameters may further be a parameter of the test image, for example. As set forth earlier, the parameters may include, but are not limited to a color, a depth, an anti-aliasing mode, an image size, etc.

As an option, the set of reference images may, initially, be manually selected (e.g. populated, etc.). For example, a user may hand pick reference images to initially define the reference image set. Thereafter, the set of reference images may be automatically populated. For example, in one particular embodiment, a first set of reference images may be manually populated, after which additional references images may be automatically included with the set. More information regarding such process of adding reference images will be set forth hereinafter in greater detail.

In one embodiment, the operation 202 may be performed in one of a plurality of selection modes. In this case, the reference image may be selected from a set of reference images based on the selection mode. In various embodiments, the selection mode may include a channel match mode, a downsample match mode, and/or an upsample match mode.

In the context of the present description, the channel match mode may require that the selected reference image have the same channels, channel data types, and channel data sizes as the test image. Thus, in the channel match mode, the selected reference image has the same color channel structure (e.g. alpha or no alpha) and depth format (e.g. z-depth/stencil). Additionally, in the channel match mode, the selected reference image has the same channel data types, and channel data sizes (e.g. 2-bit, 5-bit, 6-bit, 8-bit, 16-bit, 32-bit, etc.) as the test image. In various embodiments, such channel data type may include, but is not limited to float data, an unsigned normalized integer (UNORM), a signed normalized integer (SNORM), an unsigned integer (UINT), a signed integer (SINT), an unsigned normalized integers representing sRGB color standard (IEC), and/or any other data type.

It should be noted that the test image alpha channels may affect results on the red/green/blue channels, whereas the test image red/green/blue channels may only affect results of the same red/green/blue channel. For example, in the channel match mode, an RF16 (e.g. R16_FLOAT in Microsoft® Direct®X10) test image may be matched with an RF16_GF16 (e.g. R16G16_FLOAT in Microsoft® Direct®X10) reference image. On the other hand, an RF16 test image may not be able to be matched with an RF16_GF16_BF16_AF16 (e.g. R16G16B16A16_FLOAT in Microsoft® Direct®X10) reference image because the reference image has an alpha channel and the test image does not. Table 1 shows definitions for use in the context of image characteristics of the preceding example. As shown, an RF16 test image refers to a test image with a red channel including 16-bit floating point data.

TABLE 1

| Abbreviation | R | G | B | A | F | 16 | 32 |
|---|---|---|---|---|---|---|---|
| Definition | Red Channel | Green Channel | Blue Channel | Alpha Channel | Floating Point | 16-bit Data Width | 32-bit Data Width |

Additionally, the downsample match mode refers to a mode that requires the selected reference image to have the same channels (e.g. red/green/blue/alpha for color formats, and z-depth/stencil/VCAA for depth formats), but may have the same or a higher level data type and data size as the test image. For example, in the downsample match mode, an RF16 test image may be matched with an RF32 (e.g. R32_FLOAT in Microsoft® Direct®X10) reference image. Furthermore, in the context of the present description, the upsample match mode refers to a mode that allows the selected reference image to have different channels, data types, and sizes from the test image.

In one embodiment, the selection mode may be determined based on the set of reference images. In such case, the selection mode may be selected based on a number of reference images in the set of reference images. For example, if the set of reference images includes a small number of reference images (e.g. less than a predetermined threshold, etc.), the upsample match mode may be selected to allow for more image options when selecting the appropriate reference image. On the other hand, when the set of reference images includes a large number of reference images (e.g. greater than a predetermined threshold, etc.), the channel match mode may be selected so that the appropriate reference image may be selected based on more restrictive criteria.

In various embodiments, the selection mode may differ. In one embodiment, a user may input the selection mode into a command prompt. As an option, the user may be presented with a list of available modes to enter into the command prompt. In another embodiment, a user may be presented with a graphic user interface (GUI) from which the mode may be selected. In another embodiment, the mode may be determined from additional information relevant to the test image (e.g. if alpha blending was used to create the same, etc.).

In still another embodiment, the mode may be automatically selected based on the number of reference images in the set of reference images. In this case, different threshold numbers of reference images in the set may correspond to the different modes. For example, a low predetermined number may correspond to the automatic selection of an upsample match mode, an intermediate predetermined number may correspond to the downsample match mode, and a high predetermined number may correspond to the channel match mode. In such case, a user may have the ability to set such threshold numbers as part of a configuration setup.

Once the appropriate reference image has been selected, the reference image and/or the test image is converted to a destination format. See operation 204. In one embodiment, the destination format may be a predetermined format. In another embodiment, the destination format may be a format of the test image. In still another embodiment, the test image may be converted to a format of the reference image.

Furthermore, converting the reference image and/or the test image to the destination format may include changing various characteristics of the reference image and/or the test image. In one embodiment, converting the reference image and/or the test image to the destination format may include scaling the image. In another embodiment, converting the reference image and/or the test image to the destination format may include converting a type of the reference image and/or the test image to a destination type. Of course, in various other embodiments, any number of characteristics of the images may be modified in order to convert the images to the destination format.

It should be noted that, in the case where the images are already in the destination format, the conversion operation may be omitted. Once the images are in the destination format, the reference image and the test image are compared and a difference is determined. See operation 206.

In one embodiment, the determined difference may be a difference in at least one of the parameters of the reference image and the test image. In another embodiment, a difference of the reference image and the test image may be computed and a difference in the parameters may be determined from the difference of the images (i.e. the resultant image). Of course, the determined difference may represent any difference in any feature amongst the test image and the reference image which may be useful in verifying the test image.

Once the difference is calculated, it is determined whether the difference is greater than a threshold. See operation 208. If it is determined that the difference is greater than the threshold, the validation of the test image fails. See operation 210. On the other hand, if it is determined that the difference is less than the threshold, the validation of the test image passes. See operation 212.

As an option, the threshold may include an exact threshold. In this case, the difference between the reference image and the test image should be zero in order for the test validation of the test image to pass. In another embodiment, the threshold may include a least significant bit threshold. For example, when the difference in the test image and the reference image is in an integer format (e.g. UNORM, SNORM, UINT, SINT, SRGB, etc.), the threshold may be set such that the test image will pass if the difference is less than a certain integer (e.g. "1," etc.). In the case of images with a floating point format, the allowed difference of the threshold may be based on data width (e.g. 16 bits, 32 bits, etc.).

Strictly as an example, test images comprising 10 bit floats may have a threshold which is set to allow a difference of less than 1.0/31.0. Test images comprising 11 bit floats may have a threshold which is set to allow a difference of less than 1.0/63.0. Test images comprising 16 bit floats may have a threshold which is set to allow a difference of less than 1.0/1023.0. Further, test images comprising 32 bit floats may have a threshold which is set to allow a difference of less than 1.0/8388607.0. It should be noted, however, that thresholds corresponding to images with a floating point format may vary based on target goals of a particular test.

In still another embodiment, a high least significant bit threshold may be used. In this case, when the difference in the test image and the reference image is in an integer format, the threshold may be set such that the test image will pass if the difference is less than a large integer (e.g. ~10). Additionally, in the case of floating point formats, test images comprising floating point formats less than 16 bits may have a threshold which is set to allow a difference of less than 10/255. Furthermore, test images comprising floating point formats greater than or equal to 16 bits may have a threshold which is set to allow a difference of less than 1/255.

In various embodiments, the threshold used may be selected using different techniques. For example, in one embodiment, a user may input the threshold into a command prompt. In another embodiment, a user may be presented with a GUI from which the thresholds may be selected. In another embodiment, additional test information may be used to select the threshold.

In still another embodiment, the thresholds may be selected based on the selected mode. For example, if the channel match mode is selected, the exact threshold may be automatically selected. In this case, the difference in the images should be equal to zero.

As an additional example, the downsample match mode may correspond to an automatic selection of a least significant bit threshold. Thus, if the computed difference is less than a certain integer (e.g. "1," etc.), the test image may pass the validation. Additionally, the upsample match mode may correspond to an automatic selection of a high least significant bit threshold. In this case, if the computed difference is less than a certain integer (e.g. "10," etc.) the test image may pass the validation.

If the validation of the test image passes, the test image may be assumed to be within the acceptable threshold. As a result, the test image may be automatically added to the set of reference images such that the set of reference images is expanded. See operation 214. Thus, the test image may be used as a reference image when another test image is identified.

It should be noted that every time a test image is identified, operations 202-214 may be repeated. When enough test images pass the validation based on the threshold in operation 208, it may be determined that a graphics processor design generating the test image has been sufficiently validated. For example, when the pass rate of the test images rises above a certain percentage (e.g. 98% or 99%), it may be determined that the graphics processor design is sufficiently validated.

The automatic selection of the reference image may involve searching through a large set of reference images. In certain cases, the automatic selection may involve evaluating each image in the set of reference images to determine if the reference image is an appropriate reference image. In one embodiment, this determination may involve sequentially stepping through all of the reference images.

In another embodiment, the determination of whether a reference image is an appropriate image may involve using information from a previous search. For example, upon a first search of the set of reference images for an appropriate reference image, a path correlating to potentially appropriate reference images may be logged. Thus, upon the initiation of a second search, the path may be used to expedite the search for the appropriate reference image.

Figure 3:
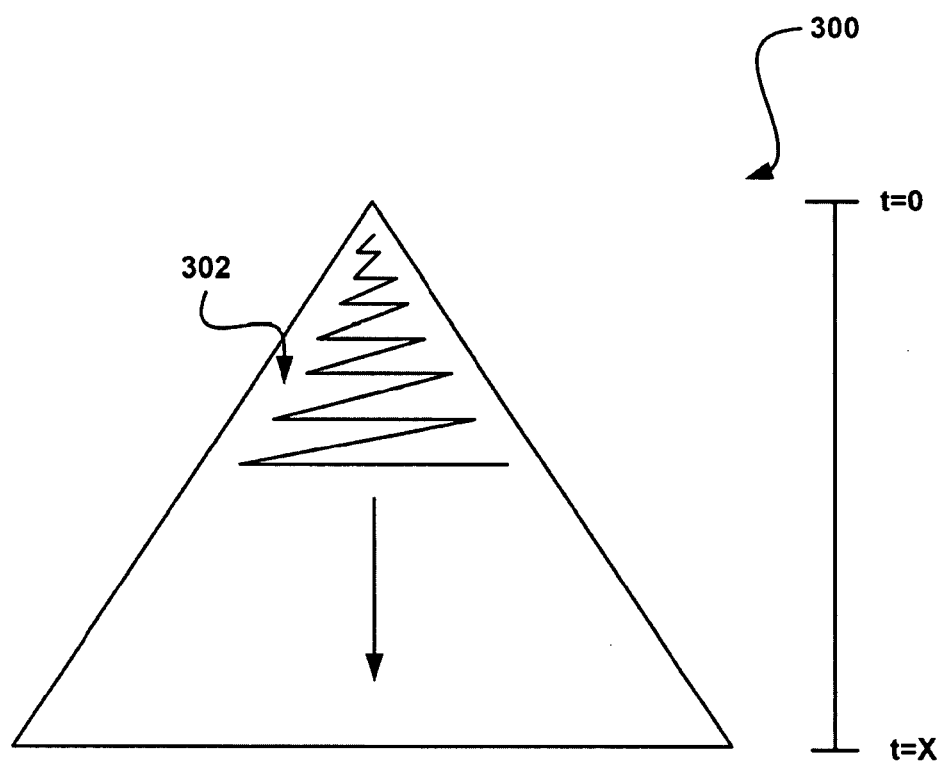
FIG. 3 shows a change in a set of reference images over a period of time, in accordance with one embodiment.

FIG. 3 shows a change in a set of reference images 300 over a period of time, in accordance with one embodiment. As shown, a set of reference images 300 is increasing over a period of time. In one embodiment, the increase in the set of reference images may be a result of test images being verified and, in turn, being added to the set of reference images 300. For example, when an automatically selected reference image is compared to a test image, and a difference in the comparison is less than a threshold, the test image may be added to the set of reference images 300.

In one embodiment, the reference images may be manually selected to initially generate the set of reference images 300 (e.g. at t=0). The initial selection of the set of reference images 300 may be based on parameters of a test image, for example. Once the initial set of reference images 300 is sufficient (e.g. multiple reference image exist to compare with the test image), an appropriate reference image may be automatically selected from the set of reference images 300 based on the parameters of the test image.

The test image and/or the reference image may then be converted into a destination format and the images may be compared to compute a difference. Once the difference is computed, the difference is compared to a threshold to determine whether the test image is acceptable. If it is determined that the test image is acceptable, the test image may be added to the set of reference images 300. Thus, the test image may be considered to be a verified image which may be used as a reference image.

This sequence may be repeated multiple times such that the set of reference images 300 expands as shown in FIG. 3. Once it is determined that the set of reference images 300 includes a sufficient number of reference images (e.g. at t=X), it may be desirable to discontinue the addition of new reference images. In this case, the set of reference images 300 may be used for automatically selecting reference images to compare to test images in order to verify the test images without adding additional images to the set of reference images 300.

Automatically selecting reference images from the set of reference images 300 may involve automatically navigating through the set of reference images 300 in order to select an appropriate reference image based on the parameters of the test image. In one embodiment, navigating through various reference images may allow for a path of navigation, or a path of appropriate reference images to be tracked (e.g. see path 302).

Tables 2 and 3 show one example of selecting reference images from the set of reference images utilizing different modes. It should be noted that, in various embodiments, the order of parameter selection for the reference image may change based on the selection mode.

TABLE 2

Test Image Characteristics test image, created with parameters: "zbuf" trace (i.e., test program name); image is color buffer;
test image created using color buffer channels: R,G
color datatype: FP16
depth buffer channels: depth + stencil
depth datatype: 24-bit
stencil datatype: 8-bit

TABLE 3

Reference Image selection in "channel" selection mode:

reference image with parameters: "zbuf" trace, color buffer image, created with: R,G,B FP16, depth 24-bit, stencil 8-bit.
in "downsample" selection mode (stop when the earliest available reference image is found):

1st) reference image with parameters: "zbuf" trace, color buffer image, created with: R,G FP16, depth FP32, stencil 8-bit.
2nd) reference image with parameters: "zbuf" trace, color buffer image, created with: R,G,B FP32, depth 24-bit, stencil 8-bit.
3rd) reference image with parameters: "zbuf" trace, color buffer image, created with: R,G,B FP32, depth FP32, stencil 8-bit.
in "upsample" selection mode (stop when the earliest search finds an available reference image):

1st) reference image with parameters: "zbuf" trace, color buffer image, created with: R,G FP10/FP11, depth 24-bit, stencil 8-bit.
2nd) reference image with parameters: "zbuf" trace, color buffer image, created with: R,G FP10/FP11, depth FP32, stencil 8-bit.
3rd) reference image with parameters: "zbuf" trace, color buffer image, created with: R,G,B FP10/FP11, depth 24-bit, stencil 8-bit.
4th) reference image with parameters: "zbuf" trace, color buffer image, created with: R,G,B FP10/FP11, depth FP32, stencil 8-bit.
5th) reference image with parameters: "zbuf" trace, color buffer image, created with: R,G 8-bit UNORM, depth 24-bit, stencil 8-bit.
6th) reference image with parameters: "zbuf" trace, color buffer image, created with: R,G 8-bit UNORM, depth FP32, stencil 8-bit.
7th) reference image with parameters: "zbuf" trace, color buffer image, created with: R,G,B 8-bit UNORM, depth 24-bit, stencil 8-bit.
8th) reference image with parameters: "zbuf" trace, color buffer image, created with: R,G,B 8-bit UNORM, depth FP32, stencil 8-bit.

Figure 4:
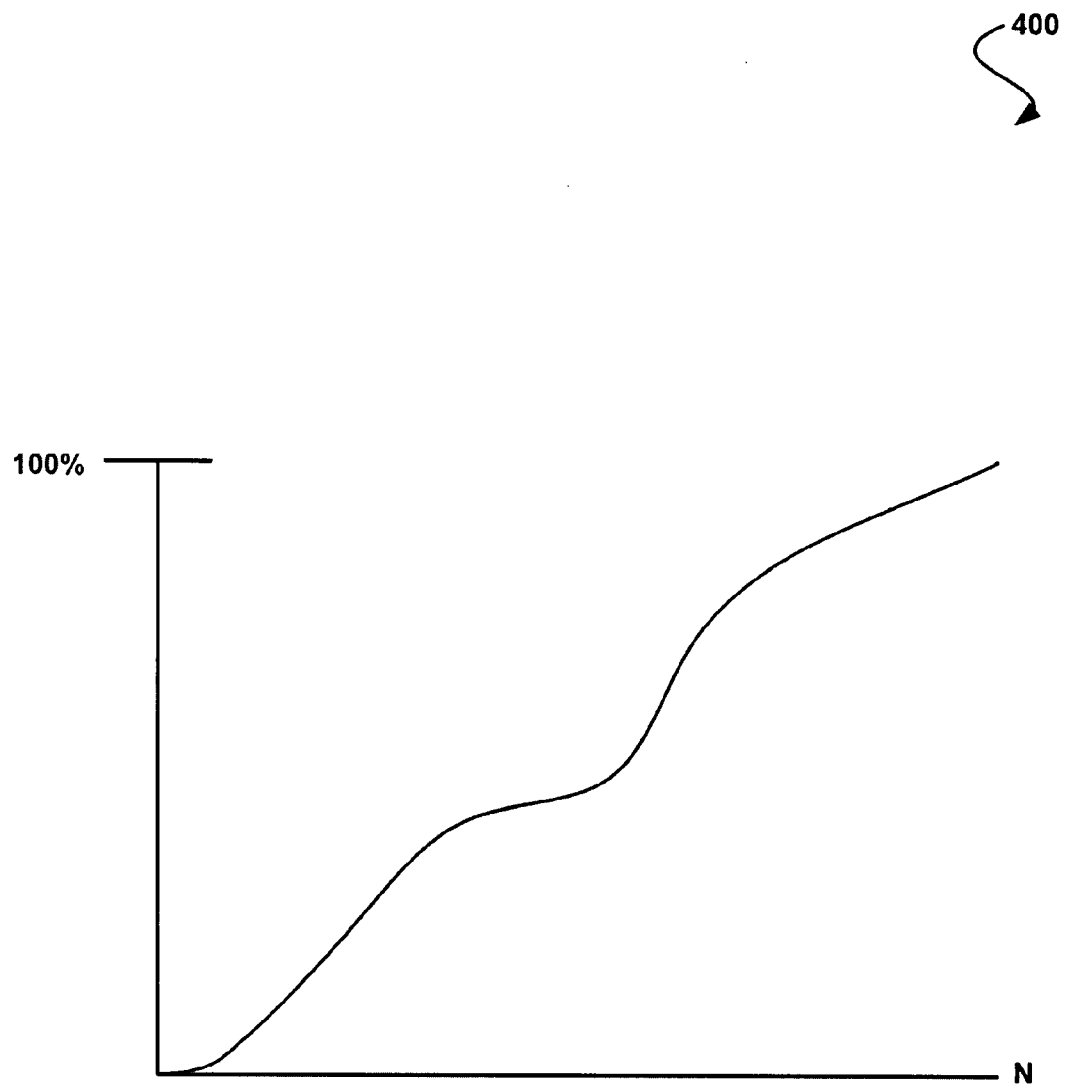
FIG. 4 shows a graph illustrating a test image pass percentage versus a number of comparisons of test images to reference images, in accordance with one embodiment.

FIG. 4 shows a graph 400 illustrating a test image pass percentage versus a number of comparisons of test images to reference images, in accordance with one embodiment. As an option, the graph 400 may be viewed in the context of the details of FIGS. 1-3. Of course, however, the graph 400 may be viewed in the context of any desired environment. Further, the aforementioned definitions may equally apply to the description below.

As shown in the graph 400, as a number of comparisons (N) of test images to reference images increases, a pass rate of the test images approaches 100%. For example, once a test image is identified, and an appropriate reference image is automatically selected based on at least one parameter of the test image, the two images are compared and a difference may be computed. The difference may then be compared to a threshold.

If it is determined, based on the threshold comparison, that the test image is acceptable, the test image may be added to a set of reference images from which the appropriate reference image was selected. As the number of reference images included in the set of reference images increases, it may become more likely to select a reference image with more of the same parameters as the test image. As the number of comparisons of the test images to reference images increases, the set of reference images increases and, in turn, the available appropriate reference images increase.

As a result, the difference between the selected reference image and the test image may decrease, which causes an increase in the pass rate of the test images when the difference is compared to a threshold. When enough test images pass the validation, it may be determined that a graphics processor design generating the test image has been sufficiently validated. For example, when the pass rate of test images rises above a certain percentage (e.g. 98% or 99%), it may be determined that the graphics processor design is sufficiently validated.

Figure 5:
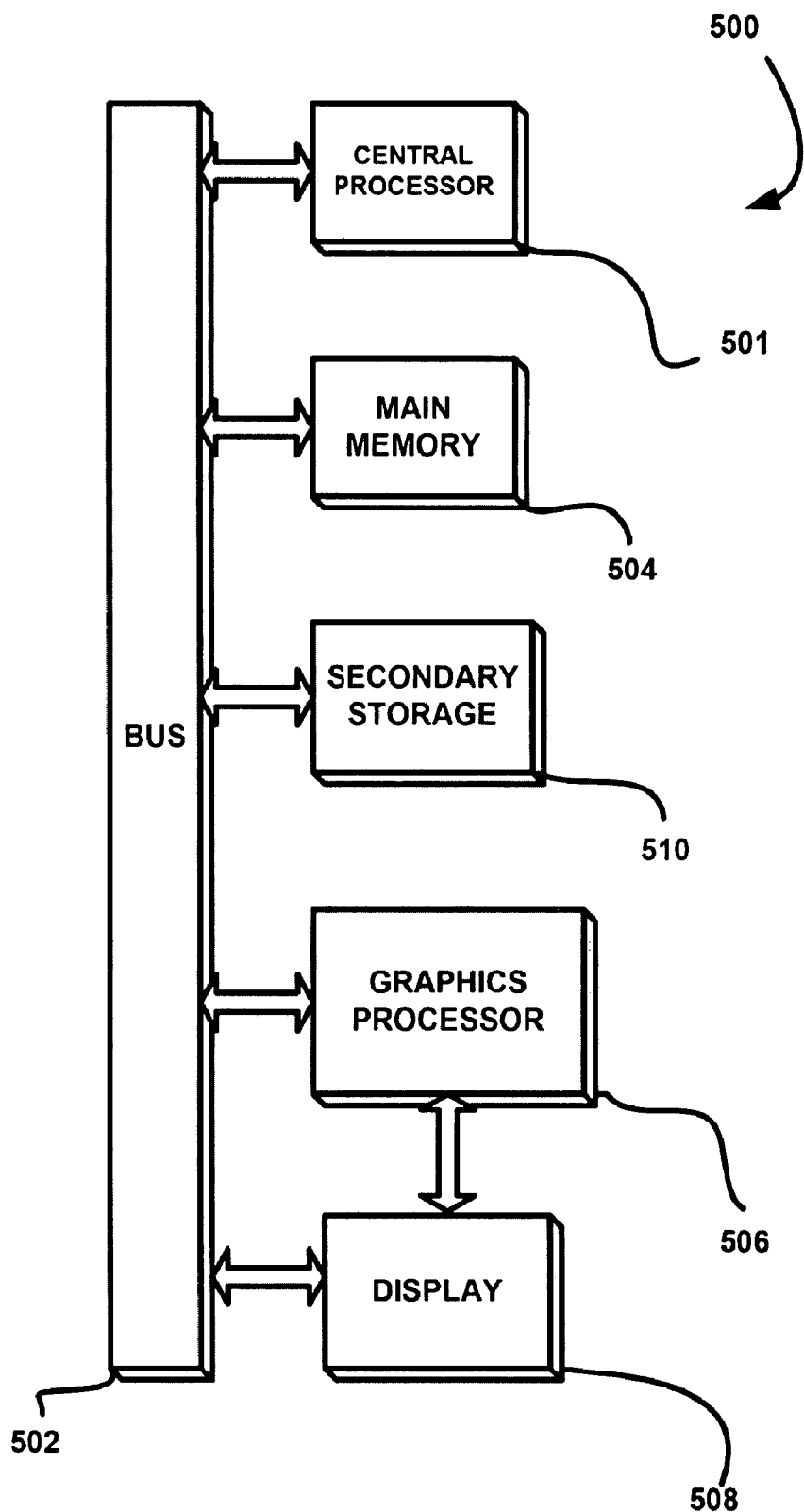
FIG. 5 illustrates an exemplary system in which the various architecture and/or functionality of the various previous embodiments may be implemented.

FIG. 5 illustrates an exemplary system 500 in which the various architecture and/or functionality of the various previous embodiments may be implemented. For example, the system 500 may be used to validate a graphics processor design and/or the graphics processor design thereof may be validated.

As shown, a system 500 is provided including at least one host processor 501 which is connected to a communication bus 502. The system 500 also includes a main memory 504. Control logic (software) and data are stored in the main memory 504 which may take the form of random access memory (RAM).

The system 500 also includes a graphics processor 506 and a display 508, i.e. a computer monitor. In one embodiment, the graphics processor 506 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 500 may also include a secondary storage 510. The secondary storage 510 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 504 and/or the secondary storage 510. Such computer programs, when executed, enable the system 500 to perform various functions. Memory 504, storage 510 and/or any other storage are possible examples of computer-readable media.

In one embodiment, the architecture and/or functionality of the various previous figures may be implemented in the context of the host processor 501, graphics processor 506, an integrated circuit (not shown) that is capable of at least a portion of the capabilities of both the host processor 501 and the graphics processor 506, a chipset (i.e. a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 500 may take the form of a desktop computer, lap-top computer, and/or any other type of logic. Still yet, the system 500 may take the form of various other devices m including, but not limited to a personal digital assistant (PDA) device, a mobile phone device, a television, etc.

Further, while not shown, the system 500 may be coupled to a network [e.g. a telecommunications network, local area network (LAN), wireless network, wide area network (WAN) such as the Internet, peer-to-peer network, cable network, etc.) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
identifying a test image;
selecting a selection mode, the selection mode including at least one of a channel match mode, a downsample match mode, and an upsample match mode;
automatically selecting, utilizing a processor, a reference image from a set of reference images;
validating a graphics processor design using the test image and the selected reference image; and
automatically and conditionally adding the test image to the set of reference images, based on a result of the validation using the test image and the selected reference image;
wherein if the selection mode includes the channel match mode, then the selected reference image must have same channels, channel data types, and channel data sizes as the test image, such that the selected reference image has a same color channel structure and depth format.

2. The method of claim 1, wherein the reference image is selected from the set of reference images based on at least one parameter.

3. The method of claim 2, wherein the at least one parameter includes at least one of color, depth, an anti-aliasing mode, and an image size.

4. The method of claim 1, wherein the reference image is selected from the set of reference images based on the selection mode.

5. The method of claim 1, wherein the selection mode is selected based on the set of reference images.

6. The method of claim 5, wherein the selection mode is selected based on a number of reference images in the set of reference images.

7. The method of claim 1, wherein the set of reference images is manually selected.

8. The method of claim 1, wherein the validating includes converting the selected reference image to a predetermined format.

9. The method of claim 1, wherein the validating includes comparing the test image and the selected reference image.

10. The method of claim 9, wherein the validating further includes determining a difference between the test image and the selected reference image.

11. The method of claim 10, wherein the validating further includes comparing the difference with a threshold.

12. The method of claim 11, wherein the threshold includes an exact threshold.

13. The method of claim 11, wherein the threshold includes a least significant bit threshold.

14. The method of claim 1, wherein the graphics processor design includes a graphics processing unit design.

15. A computer program product embodied on a non-transitory computer readable medium executed by a processor, comprising:
computer code for identifying a test image;
computer code for selecting a selection mode, the selection mode including at least one of a channel match mode, a downsample match mode, and an upsample match mode;
computer code for automatically selecting a reference image from a set of reference images;
computer code for validating a graphics processor design using the test image and the selected reference image; and
computer code for automatically and conditionally adding the test image to the set of reference images, based on a result of the validation using the test image and the selected reference image;
wherein the computer program product is operable such that if the selection mode includes the channel match mode, then the selected reference image must have same channels, channel data types, and channel data sizes as the test image, such that the selected reference image has a same color channel structure and depth format.

16. An apparatus, comprising:
a processor for:
selecting a selection mode, the selection mode including at least one of a channel match mode, a downsample match mode, and an upsample match mode, and
automatically selecting a reference image from a set of reference images;
wherein a graphics processor design is validated using a test image and the selected reference image;
wherein the test image is automatically and conditionally added to the set of reference images based on a result of the validation using the test image and the selected reference image;
wherein if the selection mode includes the channel match mode, then the selected reference image must have same channels, channel data types, and channel data sizes as the test image, such that the selected reference image has a same color channel structure and depth format.

17. The apparatus of claim 16, wherein the processor remains in communication with memory and a display via a bus.

18. A method, comprising:
identifying a test image;
selecting a selection mode, the selection mode selected based on a number of reference images in a set of reference images;
automatically selecting, utilizing a processor, a reference image from the set of reference images;
validating a graphics processor design using the test image and the selected reference image; and automatically and conditionally adding the test image to the set of reference images, based on a result of the validation using the test image and the selected reference image;

wherein the selection mode based on the number of reference images in the set of reference images is such that the number of reference images is greater when a channel match mode is selected than when an upsample match mode is selected, allowing for more image options when selecting an appropriate reference image if the set of reference images includes a small number of reference images.

19. A method comprising:

identifying a test image;

automatically selecting, utilizing a processor, a reference image from a set of reference images based on at least one parameter;

validating a graphics processor design using the test image and the selected reference image; and automatically and conditionally adding the test image to the set of reference images, based on a result of the validation using the test image and the selected reference image;

wherein the at least one parameter includes at least one of an enabled/disabled color buffer indicator and an enabled/disabled Z-buffer indicator.

20. A computer program product embodied on a non-transitory computer readable medium executed by a processor, comprising:

computer code for identifying a test image;

computer code for selecting a selection mode, the selection mode selected based on a number of reference images in a set of reference images;

computer code for automatically selecting a reference image from the set of reference images;

computer code for validating a graphics processor design using the test image and the selected reference image; and computer code for automatically and conditionally adding the test image to the set of reference images, based on a result of the validation using the test image and the selected reference image;

wherein the computer program product is operable such that the selection mode based on the number of reference images in the set of reference images is such that the number of reference images is greater when a channel match mode is selected than when an upsample match mode is selected, allowing for more image options when selecting an appropriate reference image if the set of reference images includes a small number of reference images.

21. A computer program product embodied on a non-transitory computer readable medium executed by a processor, comprising:

computer code for identifying a test image;

computer code for automatically selecting a reference image from a set of reference images based on at least one parameter;

computer code for validating a graphics processor design using the test image and the selected reference image; and computer code for automatically and conditionally adding the test image to the set of reference images, based on a result of the validation using the test image and the selected reference image;

wherein the at least one parameter includes at least one of an enabled/disabled color buffer indicator and an enabled/disabled Z-buffer indicator.

22. An apparatus, comprising:

a processor for:

selecting a selection mode, the selection mode selected based on a number of reference images in a set of reference images, and automatically selecting a reference image from the set of reference images;

wherein a graphics processor design is validated using a test image and the selected reference image;

wherein the test image is automatically and conditionally added to the set of reference images based on a result of the validation using the test image and the selected reference image;

wherein the processor is operable such that the selection mode based on the number of reference images in the set of reference images is such that the number of reference images is greater when a channel match mode is selected than when an upsample match mode is selected, allowing for more image options when selecting an appropriate reference image if the set of reference images includes a small number of reference images.

23. An apparatus, comprising:

a processor for automatically selecting a reference image from a set of reference images, the reference image selected from the set of reference images based on at least one parameter;

wherein a graphics processor design is validated using a test image and the selected reference image;

wherein the test image is automatically and conditionally added to the set of reference images based on a result of the validation using the test image and the selected reference image;

wherein the at least one parameter includes at least one of an enabled/disabled color buffer indicator and an enabled/disabled Z-buffer indicator.

* * * * *

UNITED STATES PATENT AND TRADEMARK OFFICE
CERTIFICATE OF CORRECTION

PATENT NO.         : 8,063,908 B1
APPLICATION NO.    : 11/937395
DATED              : November 22, 2011
INVENTOR(S)        : Dunaisky et al.

It is certified that error appears in the above-identified patent and that said Letters Patent is hereby corrected as shown below:

In the claims:
        Claim 19, col. 11, line 13; please replace "method" with --method,--.

Signed and Sealed this
Twenty-seventh Day of March, 2012

David J. Kappos
*Director of the United States Patent and Trademark Office*